United States Patent Office 3,427,374
Patented Feb. 11, 1969

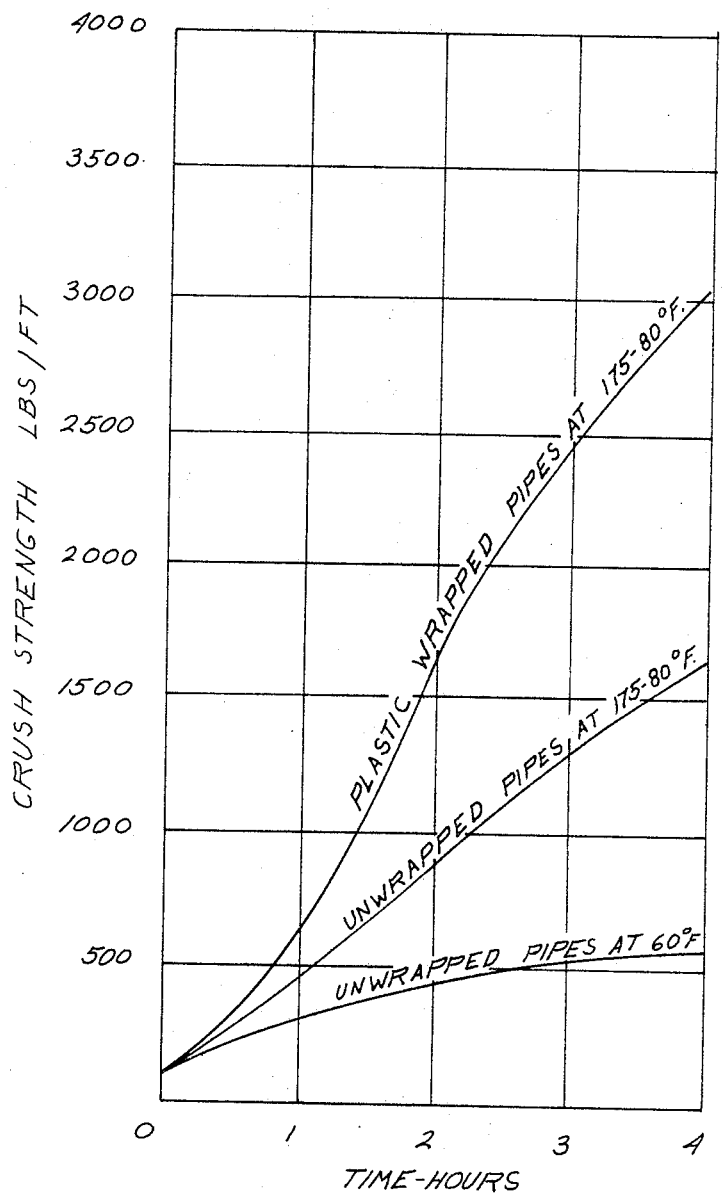

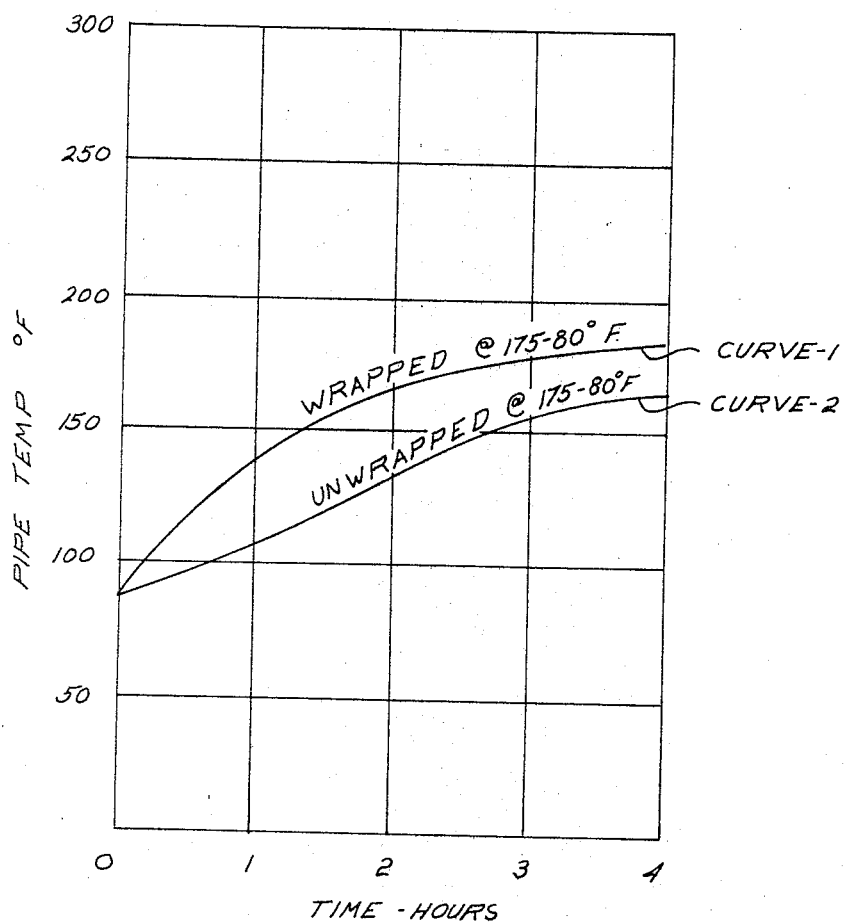

3,427,374
METHOD OF CURING CEMENTITIOUS ARTICLES
Joseph C. Jackson, Ambler, and Willard R. Seipt, Glenside, Pa., assignors to Certain-Teed Products Corporation, Ardmore, Pa., a corporation of Maryland
Filed Sept. 6, 1966, Ser. No. 577,387
U.S. Cl. 264—79          10 Claims
Int. Cl. C04f 7/00; C04b 41/30

ABSTRACT OF THE DISCLOSURE

Process for curing hydraulic cement articles wherein the freshly formed wet cement article is wrapped in a plastic film, for example, a sheet of polyethylene, which is substantially impermeable to liquid water and water vapor and transferring heat into the article when it is so wrapped, the heat being effective to accelerate the reaction between the cement and water and thereby promote cement hydration, the water impermeable film functioning to prevent loss of water from the cement article.

---

This invention relates to the production of cementitious articles and more particularly, to an improved method for curing shaped wet hydraulic cement compositions, said method employing heat to accelerate the rate of cement hydration while at the same time minimizing evaporation of the water from the composition.

"Cement" as used herein means hydraulic cement.

In the production of cement articles or fibrous-cement articles, the strength of the article is not developed until after the cement has had an opportunity to hydrate and such hydration under ambient conditions ordinarily requires considerable time, frequently running into a matter of days. This creates many problems in the production of cement articles including storage problems and bottlenecks in the overall processing.

Certain ways are known for effecting some acceleration of hydration and curing of cement articles. Some of the techniques heretofore used have in fact effected some acceleration of the hydration, but for the most part, the prior techniques are subject to one or another of numerous disadvantages and, in some cases, the methods employed do not effect sufficient acceleration to completely overcome some of the bottlenecks. The techniques employed in the prior art vary somewhat with articles of different cementitious compositions and also with articles shaped or formed by different techniques. For example, in the case of asbestos-cement pipes, it is quite common to employ a composition which requires high pressure steam curing for development of full strength. Pipes, however, are quite commonly made by winding a web of asbestos-cement, layer upon layer, on a mandrel. The article thus formed does not have sufficient initial strength to be self-supporting and therefore it must be retained upon the mandrel until at least some cure has occurred. Because of this, when high pressure steam curing cement pipe, it is customary to subject the pipes while still on the mandrel to a precuring operation, then to remove the mandrel as soon as the pipe develops sufficient strength to become self-supporting in order to permit returning the mandrel to the pipe-forming machine. The pipe then is subjected to still another curing operation to further develop its strength, and ultimately the pipe is introduced into the autoclave for the final stage of curing.

Such an operation, while capable of producing an article of good strength, is exceedingly complex and time consuming. Moreover, the initial stages of the curing are relatively slow.

Other types of curing are also known, for instance, merely permitting the formed articles to stand under ambient conditions, in which event the curing time becomes inordinately long.

The use of humidified curing tunnels is also known, but tunnel curing also is relatively slow and, in addition, like curing under ambient conditions, is objectionable for the reason that substantial quantities of moisture evaporate from the articles, thereby producing a condition in which insufficient water remains for complete cement hydration and development of full strength. Moisture evaporation from the articles could be substantially avoided by totally saturating the air in the tunnel, but it is most difficult to maintain air in a tunnel at or near 100% R.H.

Although application of heat has been resorted to in connection with the acceleration of hydration of certain types of cementitious products, nevertheless it has not been practical nor advisable to utilize this expedient for certain products, for instance, large massive products as employed for construction of roadways, bridge piers, and dams.

It is the principal object of this invention to provide an improved technique for accelerating hydration and curing of cementitious articles, and to make it practicable to utilize elevated temperatures to assist in the acceleration of the curing, without encountering certain of the problems characteristic of some of the prior known techniques.

Briefly, the present invention provides for accelerating the hydration of a cementitious article by heating the article under a condition in which the surface of the article is covered with a barrier acting to retard evaporation of water from the article. In the preferred practice of the invention, the barrier is established by wrapping a flexible water-impermeable sheet material about the article, and then heating the article while covered with said sheet material. When "water-impermeable" is used herein to describe the sheet material utilized to cover the article it means that the sheet material is substantially impermeable to liquid water and water vapor.

In the preferred practice of the invention, the sheet material employed to cover the surface of the article advantageously takes the form of a thin film, such as a plastic strip which may be wound around the article and thereby snuggly engage the surface of the article. In consequence, when the article is heated, any air space between the article itself and the enclosing film or sheet very quickly becomes 100% saturated with water vapor. The impermeable film itself and also the water-saturated air serve as an evaporation barrier, greatly diminishing any further evaporation during the curing operation, notwithstanding the fact that the temperature is elevated to a point approaching the boiling point of water or for limited periods of time to a point higher than 212° F., for example, about 225° F. up to about two hours.

The technique of the present invention has several distinctive advantages, including the fact that the initial contact of the covering film with the surface of the article results in the establishment of the evaporation barrier without the necessity for using elevated pressures and the complications attendent upon employment of special pressuring equipment of an autoclave.

Moreover, the covering film of sheet material, such as the plastic film preferably utilized, may readily be separated from the article after the curing is carried out and the article does not require any special cleansing or washing-up operation, and additionally there is not imparted to the article any undesirable appearance and/or residue.

How these and other objects and advantages are attained will be clear from the following description of this invention and the accompanying drawings in which:

FIGURE 1 is a graph comparing the development of the strength of wet asbestos-cement pipes during curing thereof by the method of this invention with the strength developed in like pipes cured by other methods; and FIGURE 2 is a graph comparing the increase in temperature of wet asbestos-cement pipes cured according to the method of this invention with the increase in temperature of like pipes cured by other methods.

In considering the technique of the present invention in greater detail, it is first pointed out that the flexible water-impermeable film applied to the article serves as a physical barrier which maintains substantially all of the water which evaporates from the cement or fibrous-cement composition between the surface of the composition and the plastic film. This results in the establishment of a curing environment characterized by a number of features which insure accelerated cement hydration and overall proper curing of the article.

As mentioned above, air between the surface of the composition and the plastic film becomes completely saturated with water vapor and this condition is established relatively quickly as the article is heated. Thus, a condition of dynamic equilibrium is established wherein for each molecule of water that evaporates from the surface of the composition, a molecule of water vapor condenses. Consequently, there is substantially no net water loss from the composition. In addition, this refluxing action has been found to be extremely beneficial, particularly when the cementitious article being cured is a pipe or similar article. The condensed water vapor permeates the pipe wall and serves as an excellent heat transfer medium so that the heat transfer through the pipe wall is rapid and relatively uniform. Also, heat transfer through the saturated air and the condensed water on the surface of the article is more efficient than heat transfer through an air gap. In addition, because the heat of vaporization of the evaporating water is equal to the heat of condensation in the dynamic equilibrium system, there is substantially no net heat loss from the system, so that the temperature of the article will fairly quickly reach the environmental temperature at which the article is being cured. This invention thus provides a method whereby the temperature of the uncured article can be relatively quickly raised to the desired curing environmental temperature and whereby substantially all of the water contained in the wet cement composition is maintained therein.

Curing the wet cement or fibrous cement compositions according to the method of this invention has several important advantages over the methods heretofore available.

It is not necessary, when employing the method of this invention, to have the cement initially set before the composition is subjected to heat as is required in that known method where the composition is cured in a heated environment with sprinkling or spraying means being utilized to replace the water which evaporates from the composition.

In contrast to the prior known method which utilizes heated and humidified air, the problems attendant with providing and maintaining hot air partially or completely saturated, are entirely avoided because the process described herein is not dependent on the humidity conditions of the environment surrounding the plastic wrapped article. Still another advantage is that the temperature of the plastic-wrapped wet composition can be raised relatively quickly to the temperature of the curing environment.

The plastic film utilized to cover the surface of the wet shaped cement or asbestos-cement article must be water-impermeable. Additionally, it is preferred that the film not degrade during the time it is subjected to the curing temperatures described herein and as such the film should not melt or become brittle and should have a high service temperature. The film also should be resistant to chemical attack by the alkaline cement composition and have good heat transfer properties. Other preferred properties of the film are high tensile strength and high impact and tear strength.

Exemplary water-impermeable films that can be used in the practice of this invention are films made from polyethylene, saran, polyethylene terephthalate and polypropylene, Teflon, and polyvinylfluoride.

The thickness of the flexible water-impermeable film utilized will depend on the strength of the film. It is most desirable to use as thin a film as possible, but nevertheless, one which will not tear easily as the article is wrapped. In wrapping asbestos-cement pipes, films made from either polyethylene, saran, or polyethylene terephthalate and having thickness of about 1.5 mils or higher can be used successfully and without tearing.

For best results the surface of the shaped wet cement or fibrous-cement composition should be covered with the plastic film before any significant amount of water evaporation and preferably the wet composition is covered with the plastic film immediately after the shape has been formed.

The article being cured can be heated by any suitable means. For example, the plastic-wrapped article can be heated by covering or wrapping the same with a heated blanket or in the case of a hollow article, such as a pipe, by inserting a heating element into the hollow of the article. A very desirable means of heating is to place the plastic-wrapped cement article in an oven or curing tunnel through which is circulated heated air. The temperature of the plastic-wrapped article will fairly quickly reach the temperature of this heated environment. It is unnecessary, of course, when curing articles in heated air according to the method of this invention to use humidified air, because, in effect, a saturated environment is established within the wrapping, and this notwithstanding that the wrapping may be made up of a convolutely or helically wound strip having many edge joints.

The cement or fibrous cement article should be heated to and maintained at temperatures ranging from 120° F. to about 200° F. and preferably 175° F. to about 200° F. to cure the article. With respect to temperatures lower than about 120° F., it will be appreciated that any temperature higher than room temperature will accelerate the hydration of the cement to some extent. However, the cement hydration rate will be increased only moderately if the curing is accomplished at temperatures below about 120° F. With respect to temperatures near 212° F., and above, it has been found that the water on the surface of the cement composition begins to boil when the wrapped article is heated at atmospheric pressure at such temperatures, thereby creating sufficient pressure for the water vapor to escape through any seams that are formed when the article is covered or wrapped with the water-impermeable film. This is undesirable because the water in the composition necessary for cement hydration is lost. If steps are taken to prevent the water vapor from escaping through the seams, the film will have a tendency to rupture. Temperatures of about 212° F. and higher can be used to accomplish the curing of the wrapped article if the article is subjected to pressure to increase the boiling point of the water. Thus, for example, the article can be cured at temperatures higher than 212° F. by placing the wrapped article in a heated and pressurized chamber.

It should be understood that it is possible to subject the wrapped article to temperatures of about 212° F. and higher for limited periods of time, i.e., for a length of time until the temperature of the article reaches 212° F. and the water begins to boil, but the temperature should be lowered before significant loss of water from the article occurs.

Cement or fibrous-cement articles can be cured to varying degrees according to the method described herein. It is within the scope of this invention to allow the wrapped article to be heated until the cement has hardened sufficiently to allow the article to be put to its intended use. On the other hand, curing according to the method described herein can be terminated as soon as the cement has set sufficiently to impart to the article adequate rigidity and strength so that the article is not vulnerable to damage, such as bending and denting, when the article is moved from one place to another. For example, if it is necessary to subject the article to high pressure steam curing, it generally will be expedient to terminate curing according to this invention as soon as the article has developed sufficient rigidity and strength through cement set to resist damage during transfer to and processing of the article in the autoclave. The plastic film should be removed prior to autoclaving.

The length of time required to cure the cement or fibrous-cement article will depend on a number of factors. The time will depend on the desired degree of cement hydration and also on the particular type of cement utilized because different cements hydrate at different rates. In addition, the time for curing the article will depend on the temperature at which the pipe is cured. According to the invention, the time for curing the heated wrapped article should be sufficient to effect some significant hydration of the cement. In general, it will be found that this requires heating the wrapped article for at least 60 to 120 minutes depending somewhat upon various of the factors just mentioned. Generally, it will be preferred to keep the wrapped article heated for a longer period of time so as to take full advantage of the accelerated hydration made possible according to the technique of the present invention. Thus, as is illustrated by examples given herebelow, to effect extensive hydration, times running anywhere from 60 minutes up to several and indeed in some cases, many hours should be used.

In general, any kind of shaped article made from hydratable cement or fibrous-cement composition which is not degraded when subjected to heat can be cured according to the method described herein.

Asbestos-cement articles, which are used in large quantities, of various shapes and sizes are particularly suited to being cured according to this invention because the wet asbestos fiber-reinforced cement composition has very little or no tendency to degrade when subjected to the elevated temperatures set forth herein for the curing. Exemplary asbestos-cement articles are straight sections of pipe having inside diameters of from 3″ to 28″ and wall thicknesses of from 0.25″ to 2.5″, curved sections of pipe, joints, endcaps, sheets, boards, and other structural elements used in buildings such as box beams.

In general, in addition to water, these asbestos-cement articles are comprised of the following ingredients present in the amounts indicated:

| | Parts by wt. based on 100 parts of dry ingredients |
|---|---|
| (a) Hydraulic cement | 10–90 |
| (b) Asbestos | 10–50 |
| (c) Auxiliary cementing agents | Up to 50 |

The shaped cement or fibrous-cement compositions which can be cured according to the method of this invention can be comprised of any hydraulic cement normally utilized in the production of such articles. Typical examples of such hydraulic cements are portland cements, pozzolana cements, and similar materials.

The various types of fibers normally included in fibrous-cement articles can also be utilized in compositions subjected to the curing method of this invention. Asbestos fibers are especially desirable and with respect to asbestos fibers, the following are typical examples of the kinds that can be used: chrysotile, crocidolite and amosite. Other natural or synthetic fibers may also be used in the fibrous-cement composition.

Auxiliary cementing agents that can be included in the cement-containing compositions described herein are silica flour, pozzolana, diatomaceous earth, and the like.

In addition, the compositions mal also contain other materials generally used in hydraulic cement compositions such as, for example, fillers including pulverized limestone, clays and sand, pigments if a colored product is desired, cement accelerators or retarders, wetting agents, flexing agents, plasticizing agents, extrusion-aid additives, etc. Up to about 25 parts (based on 100 parts of dry ingredients) of such materials can be incorporated into the compositions.

The cement or fibrous-cement shape can be formed according to any of the conventional techniques, including molding or extruding the wet composition, or in the case of hollow cylindrical objects such as asbestos-cement pipes, by winding a web of asbestos-cement upon a mandrel, or in the case of flat sheets by winding on an accumulator roll.

If the shaped-wet composition is covered with the water-impermeable plastic film immediately after it has been formed, as is preferred, it will normally be necessary to support the shaped composition to prevent it from deforming. This is because the cement or fibrous-cement articles to which this invention relates are generally formed from aqueous cement compositions having a consistency such that the article will not retain its shape, i.e., it is not capable of prolonged self-support unless the article is provided with a support. For example, a laminated asbestos-cement pipe which has been formed on a hollow mandrel can be wrapped with the plastic film while supported on the mandrel. The wrapped and supported pipe can then be heated as by placing the same in an oven or heated tunnel. It is unnecessary and, indeed, it is perferred that the open ends of the mandrel not be covered by the plastic film. This is because heat transfer into the pipe will occur at a faster rate due to the exposed inside surface area of the mandrel. By stripping the mandrel from the pipe as soon as the pipe has developed sufficient strength to support itself, the mandrel will be available for the forming of additional pipes. The rigid plastic-wrapped pipe free of the mandrel can then be subjected to additional curing. However, the ends of the pipe should first be sealed off as by covering the same with a water-impermeable film to prevent water from evaporating from the interior surface of the pipe. If, on the other hand, the asbestos-cement pipe is formed by an extrusion operation, the plastic wrapped pipe can be supported in an oven or heated tunnel on a V-shaped trough. An article such as a box beam or flat sheet or other structural component can be supported conveniently on similar V-troughs or racks.

The following example serves to illustrate the practice of this invention and in particular shows the formation of asbestos-cement pipes and curing of the pipes by wrapping them in a flexible water-impermeable polyethylene film and transferring heat through the film into the pipes. The ingredients from which the pipes are made are given in parts by weight.

EXAMPLE I

There were mixed 282 parts of Type I portland cement, 85 parts of chrysotile and crocidolite asbestos and 200 parts of silica in a dry blender. Forty parts of this dry blend were mixed with 400 parts of water in a propeller type mixer and further diluted with another 400 parts of water containing about 4 to 8 parts of recovered solids. From this mixture there were formed three pipe samples having an outside diameter of 7.18 inches and an inside diameter of 5.78 inches and a length of 12 inches by forming a wet web on a cylinder-like paper making machine and rolling the ply convolutely on a mandrel having an outside diameter of 5.76 inches. Immediately after the three pipe samples were formed, the pipes, with mandrel in place, were convolutely hand wrapped tightly with a film of polyethylene having a thickness of 1.5 mils and a width of 40 inches. The polyethylene wrapped pipes were then transferred to a tunnel through which was circulated heated air. The average temperature inside the tunnel was 175° F.–180° F. The three wrapped pipes were allowed to cure in the tunnel for different periods of time, one for one hour, one for two hours, and the remaining pipe for four hours. After curing each of the pipes for its allotted time period, it was removed from the tunnel, the mandrel was stripped and the pipe was subjected to a wet crush test. By measuring the crush strength of the three pipes cured for different periods of time, it was possible to determine the rate of strength development of the pipes, which in turn is an indication of the rate at which the cement in the composition is hydrating since substantially no loss of water by evaporation has taken place. Crush strength was determined by the standard ASTM C–500 except that the rate of loading was regulated to compensate for the variable section deformation at the point of ultimate strength. The ultimate load was recorded as crush strength in pounds per foot.

The crush strength of the pipes is reported in Table I below wherein there is also listed the crush strength of pipes formed from the same compensation and in the same way as described in Example I but cured with their surface exposed to air having the temperature and humidity conditions indicated in the table. These pipes are identified in the Table I as "unwrapped pipes." There is also reported in Table I the crush strength of pipes formed as described above, but subjected to the wet crush test immediately after forming and thus before any significant amount of cement set.

TABLE I

| Time cured hours | Crush Strength, lbs./ft. | | |
| --- | --- | --- | --- |
| | Unwrapped Pipes | | Plastic Wrapped Pipes |
| | Cured in Air at 60° F. and 60% R.H. | Cured in Air at 175-80° F. 7nd 5-10% R.H. | Cured in Air at 175-80° F. and 5-10% R.H. |
| 0 | 90 | 90 | 90 |
| 1 | 300 | 450 | 625 |
| 2 | 425 | 875 | 1,625 |
| 4 | 550 | 1,650 | 3,050 |

It readily can be seen from Table I above and FIGURE 1 which graphically pictures the data included in Table I that the crush strength of the pipes which were wrapped developed at a much faster rate than the unwrapped pipes, even in the case of curing the unwrapped pipes at the same environmental temperature, i.e., 175–80° F., as the wrapped pipes. This is evidence that the water of hydration is maintained in the compositions during the curing and that the rate of hydration of the cement is indeed accelerated when cement compositions are cured according to the method of this invention. Additional evidence that the water of hydration was maintained in the plastic wrapped pipes was that the cured pipes weighed substantially the same as the wet pipes. This was not true of the unwrapped pipes. On the contrary, at elevated temperatures the unwrapped pipes experienced considerable weight loss and developed strength by drying out.

In Table II below, there is reported the crush strength of pipes that were subjected to the crush strength test after they were substantially hydrated by high pressure steam curing. The pipes were formed from the composition and by the method set forth in Example I above. Prior to autoclaving, the pipes were cured by each of the methods described above for a period of about two hours. The pipes were then autoclaved for ten hours under a pressure of 125 p.s.i.g. After removal from the autoclave, the crush strength was determined.

Table II

Method of curing: Crush strength lbs./ft.
Unwrapped pipe cured in air at 60° F. and 60% R.H. _____ 7230
Unwrapped pipe cured in air at 175–80° F. and 5–10% R.H. _____ 7000
Plastic wrapped pipe heated in air at 175–80° F. and 5–10% R.H. _____ 7350

The crush strength values reported in Table II is evidence that the final product strength of cement articles cured according to the method of the invention is of high quality and indeed even of better quality than pipes cured according to the conventional methods.

If desired, when using the method of the present invention, the total curing time may be shortened while at the same time achieving a crush strength equivalent to that obtained by other techniques.

FIGURE 2 illustrates that cement or fibrous-cement articles which are wrapped in plastic and cured in heated air increase in temperature to the temperature of the heated air at a faster rate than unwrapped articles. This is significant because the higher the temperature of the article, the faster the cement hydrates. Curve 1 of FIGURE 2 was plotted by measuring the surface temperature periodically of an asbestos-cement pipe wrapped in 1.5 mils polyethylene film and exposed to air having a temperature of 175–80° F. and a relative humidity of 5 to 10%. Curve 2 of FIGURE 2 was plotted by measuring periodically the surface temperature of a like pipe cured in the same environment but with its surface exposed to the air. The unwrapped pipe did not increase in temperature at the same rate as the wrapped pipe because of the cooling effect of water evaporating from the unwrapped pipe. On the other hand, there was substantially no net water loss from the plastic-wrapped pipe and therefore virtually all of the sensible heat transferred to the pipe from the heated air was used to increase the temperature of the pipe. It has also been observed that water losses from an unwrapped pipe are the cause of a temperature gradient within the pipe wall during part of the curing period. This is undesirable because it retards the rate of heat transfer and contributes to thermal stress within the pipe section. However, and as previously mentioned above, when the pipe is wrapped in plastic, water permeates the pipe wall and acts as a natural heat conductor so that heat transfer is uniform thereby eliminating the development of a large temperature differential within the pipe wall. If the unwrapped pipe was cured beyond the four-hour period shown in the graph, water evaporation from the pipe would eventually cease and the temperature of the pipe would subsequently reach the temperature of the air. However, this is of little consequence in promoting hydration since the water necessary for hydration is no longer available.

Curing the shaped cement or fibrous-cement compositions according to the method of this invention provides numerous advantages over the methods heretofore known. It enables the cement article to be handled without being deformed, in much shorter periods of time. For example, curing the pipe in the wrapped condition at 175–80° F. results in a 39% strength increase in the first hour, an 86% increase in the second hour and an 88% increase in four hours, over similar strengths for pipe sections treated in an unwrapped condition at the same temperature. This strength differential becomes greater and at a faster rate as higher environmental curing temperatures are employed. Asbestos-cement pipes cured according to this invention can normally be machined when its crush strength has developed to approximately 50% of final product crushing strength. When curing the plastic-wrapped pipe at a temperature of 175–80° F., this degree of strength can be obtained in about four to five hours, whereas heretofore pipes had to be high pressure steam cured or else normal cured for several days to have this strength developed. This invention also provides a method whereby the curing operation can be controlled to a high degree.

We claim:

1. In the production of cement or fibrous-cement article, the method which comprises forming the article to the desired shape from an aqueous-cement composition in a condition having a consistency incapable of prolonged self-support in the shape of said article, supporting the article in the desired formed shape, wrapping the article in a water-impermeable plastic film and transferring heat into the article through the film to raise the temperature of the article to between about 120° F. and 200° F. until the cement has become sufficiently set to render the article self-supporting.

2. In the production of an asbestos-cement pipe, the method which comprises forming a pipe on a mandrel from an aqueous-cement mixture, substantially immediately after the pipe has been formed, curing the pipe by wrapping the pipe as supported on the mandrel in a water-impermeable plastic film, the curing further including heating the pipe to a temperature between about 120° F. and 200° F. until the cement has set sufficiently to render the pipe self-supporting and thereafter stripping the mandrel from the pipe, and continuing the curing of the self-supporting pipe stripped of the mandrel by maintaining the temperature of the pipe as wrapped in the plastic film between about 120° F. and 200° F.

3. A method according to claim 2 in which the curing of the self-supporting pipe is continued until the cement has set sufficiently to impart sufficient strength to the pipe so that upon transfer handling it will resist damage, the mehod further including removing the film from the pipe and thereafter subjecting the pipe to high pressure steam curing.

4. The method to claim 2 in which the temperature of the pipe for at least the curing of the pipe while supported on the mandrel is between about 175° F. and 200° F.

5. In the production of a cement or fibrous-cement article, the method which comprises forming the article to the desired shape from a hydratable aqueous-cement mixture having a consistency incapable of prolonged self-support in the shape of the article, supporting the article to maintain the article in its desired shape, and accelerating the hydration of the cement by heating the supported article while its surface is covered with a water-impermeable plastic film.

6. In the production of cement or firous-cement shapes, the method which comprises forming the shape from a water-cement mixture, and hydrating the cement by wrapping the article in a water-impermeable plastic film and heating the article while so wrapped for a period of time sufficient to advance the hydration to the point where the article is self-supporting.

7. In the production of a fibrous-cement article, the method which comprises forming the article to the desired shape from an aqueous composition containing the following constituents in the amounts indicated:

|  | Parts by wt. based on 100 parts of dry ingredients |
|---|---|
| (a) Hydraulic cement | 10–90 |
| (b) Asbestos | 10–50 |
| (c) Auxiliary cementing agents | Up to 50 | wrapping the formed article in a water-impermeable plastic film and raising the temperature of the article as wrapped in the film to between about 120° F. and 200° F. for a period of time of at least 60 minutes and until significant hydration of the cement has been effected.

8. A method according to claim 7 wherein the film is polyethylene.

9. A method according to claim 7 wherein the temperature is between about 175° F. and 200° F.

10. In the production of a cement or fibrous-cement article, the method which comprises forming the article to the desired shape from an aqueous cement composition, curing the article by covering the surface of the article with a water-impermeable plastic film thereby trapping air between the surface of the article and the film, the curing further including transferring heat into the article through the film and the air for at least a period of time sufficient to substantially saturate the air with water vapor.

References Cited
UNITED STATES PATENTS

| 2,084,354 | 6/1937 | Morbelli | 264 |
| 2,143,515 | 1/1939 | Hayden | 264—79 |
| 2,275,272 | 3/1942 | Scripture | 264—79 |
| 2,329,184 | 9/1943 | Cann | 264 |
| 2,963,765 | 12/1960 | Tillman | 264 |

JULUIS FROME, *Primary Examiner.*

JEFFERY R. THURLOW, *Assistant Examiner.*

U.S. Cl. X.R.

106—12; 264—133